United States Patent [19]
Chabrolle

[11] Patent Number: 5,057,958
[45] Date of Patent: Oct. 15, 1991

[54] MAGNETIC HEAD FOR MAGNETIC TRACKS WITH STRONG FIELD

[75] Inventor: Jacques Chabrolle, Beaune, France

[73] Assignee: Compagnie Europeenne de Composants Electroniques LCC, Courbevoie, France

[21] Appl. No.: 368,339
[22] PCT Filed: Nov. 18, 1987
[86] PCT No.: PCT/FR87/00455
  § 371 Date: Jul. 17, 1989
  § 102(e) Date: Jul. 17, 1989
[87] PCT Pub. No.: WO88/04093
  PCT Pub. Date: Jun. 2, 1988

[30] Foreign Application Priority Data
  Nov. 18, 1986 [FR] France ................ 86 15998

[51] Int. Cl.$^5$ ............................ G11B 5/127
[52] U.S. Cl. ...................... 360/125; 360/123
[58] Field of Search ..................... 360/125, 123

[56] References Cited
U.S. PATENT DOCUMENTS 2,361,752 10/1944 Eilenberger .
3,000,078 9/1961 Emenaker et al. .
3,214,645 10/1965 Gabor .
3,466,637 9/1969 Hagadorn .
3,584,378 6/1971 Duinker et al. .
3,686,466 8/1972 Sato et al. .
4,291,354 9/1981 Chase .

FOREIGN PATENT DOCUMENTS 0068995 9/1969 European Pat. Off. .
1159994 7/1958 France .

OTHER PUBLICATIONS

Patent Abstracts of Japan, vol. 7, No: 188, Aug. 17, 1983, & JP, A, 5888814 (Matsushita Denki Sangyo K.K.) May 27, 1983.
Patent Abstracts of Japan, vol. 6, No: 192 Sep. 30, 1982, & JP, A, 57103116 Jun. 26, 1982, (Sony K.K.).
Patent Abstracts of Japan, vol. 4, No: 78, Jun. 6, 1980, & JP, A, 5542351 (Matsushita Denki Sangyo K.K.) Mar. 25, 1980.

Primary Examiner—A. J. Heinz
Attorney, Agent, or Firm—Oblon, Spivak, McClelland, Maier & Neustadt

[57] ABSTRACT

The invention concerns a single-track or multiple-track reading and/or writing head. The magnetic head comprises, for one magnetic track, two pole pieces separated by a gap (15), each being housed in a mounting made of a non-magnetic material, the pole pieces and the mounting having a common plane defining the active face of the head. The magnetic head further comprises an element (26) for closing the magnetic circuit supporting at least one coil (27).

10 Claims, 2 Drawing Sheets

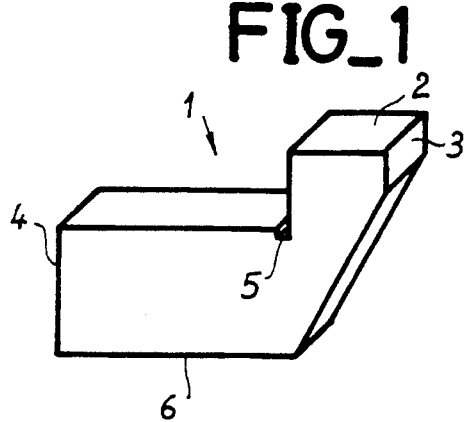
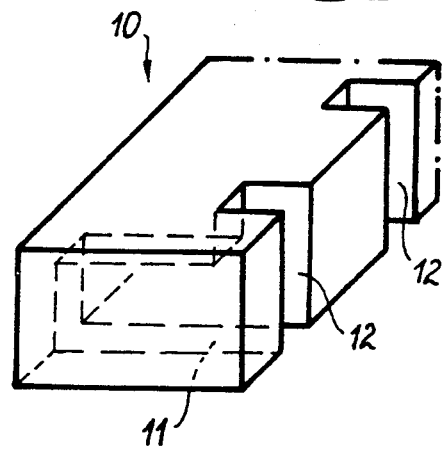
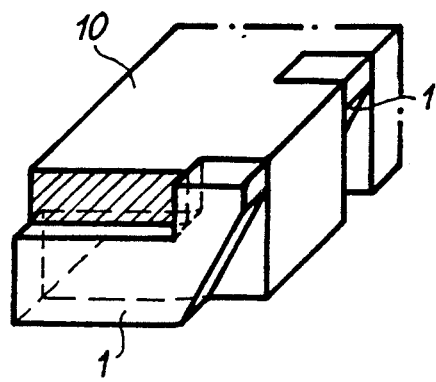
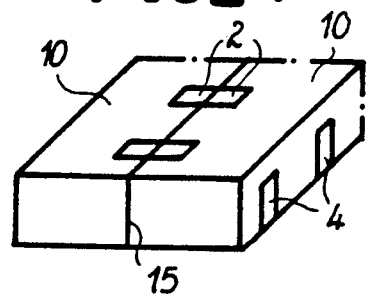
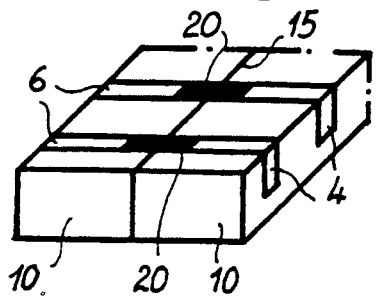
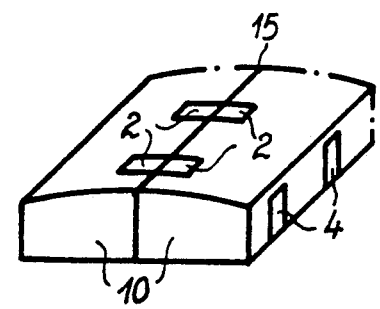

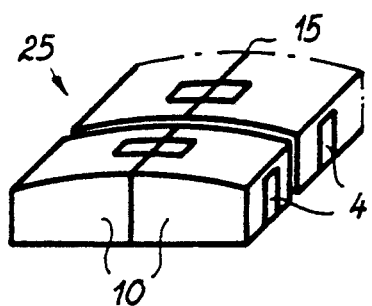
FIG_7
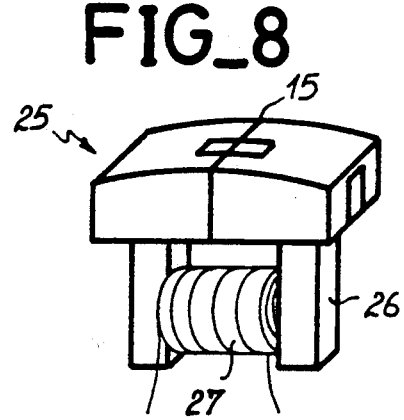
FIG_8
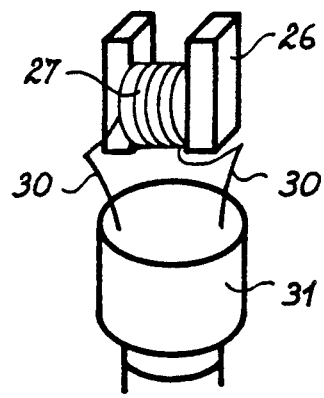
FIG_9
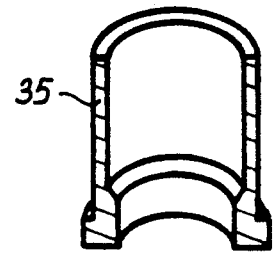
FIG_10
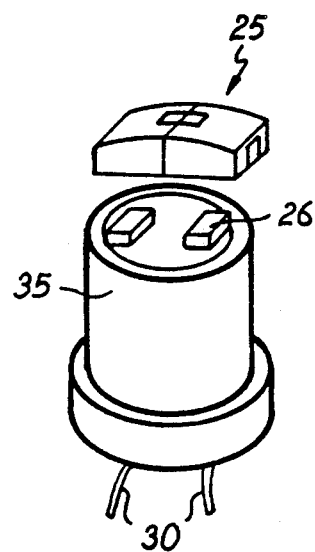
FIG_11

MAGNETIC HEAD FOR MAGNETIC TRACKS WITH STRONG FIELD

The invention concerns writing and/or reading magnetic heads for magnetic tracks with strong coercive fields, i.e. with values ranging from 24,000 to 40,000 A/m.

In order to improve the protection of digital magnetic recordings, especially in the field of computerized money systems, magnetic layers with strong coercive fields have been developed. These have gradually attained very high values, generally greater than 20,000 A/m. This type of magnetic medium is particularly difficult to saturate and, therefore, necessitates a magnetic recording head of a special type. In effect, the geometry usually employed for the making of these heads cannot be entirely called into question since the principle of magnetic recording consists in the use of a magnetic circuit enabling the concentration of a magnetic field in a restricted section of said circuit. This zone, called a gap, which is very short and has a permeability of the order of 1, has great reluctance which contributes to and promotes the spread of the magnetic field outside the circuit. This zone is therefore a source of "leaks" which ensure the magnetic polarization of the layer forming the recording track, which is in contact, in varying degrees, with this zone of the recording head.

Generally, the magnetic circuit contributing to this field concentration (created by the passage of a current in a coil placed on said circuit) is made of a magnetic material having characteristics that are suited to this application. The magnetic permeability is chosen to be as high as possible so as to ensure that the magnetic flux, created by the passage of the current in the excitation coil, is properly channelled. Furthermore, there is a demand for a suitable induction at saturation in order to minimize the excitation current. Owing to the application in frequency, there is a demand for materials showing low losses (eddy current losses and hysteresis losses) as a function of frequency. The most adapted materials, having intrinsic characteristics that are precisely suited to these three variables, are generally sintered materials of the ferrite type which, owing to their structure, ensure a worthwhile compromise between these variables. However, for the application in question, these materials do not have a sufficiently high induction at saturation to ensure proper saturation of the recording layer. Generally, the small sections used in the leakage zone (the gap zone) lead to a premature saturation of the concentration material and, consequently, do not make it possible to work in very strong fields such as those needed to ensure the saturation of a recording track with a coercive field of up to 40,000 A/m or more.

To overcome these disadvantages, the invention proposes a magnetic head which enables the saturation of magnetic layers with coercive fields of more than 20,000 A/m. This magnetic head is compatible with the reading and writing devices already in use. The invention uses a solid metal magnetic material with magnetic characteristics that are well suited to obtaining the saturation of a highly coercive field track (of more than 20,000 A/m for example). It enables the making of heads that can be used for recording on tracks with strong coercive fields and are, at the same time, highly resistant to wear and tear. This latter point, which is of a strictly mechanical order, is very important in use, inter alia, for the maintenance and reliability of electromagnetic writing performance characteristics. It provides for the mechanical (plane, cylindrical trueing, etc.) of a material which, by its composition, is reputed to be very sensitive to stresses without being obliged to be subjected to a final heat treatment capable of restoring its original characteristics to this material.

The invention therefore has an object, a single track or multiple-track reading and/or writing magnetic head characterized in that it comprises, for a magnetic track:

two pole pieces made of a solid metallic material and separated by a gap, each being housed in cavity machined in a mounting made of a non-magnetic material, the pole pieces and the mounting possessing a common plane that defines the active face of the magnetic head, an element to close the magnetic circuit, at least one coil set on the closing element, the magnetic head being also characterized in that each pole piece, formed by a first and a second arm, has a general shape of an L and is fixed in the cavity, of a corresponding shape, machined in its mounting, the sets formed by the mounting/pole piece associations being arranged symmetrically with respect to the gap so that each of the pole pieces presents a contact face with the gap formed with their first arm, a contact face with said closing element formed with their second branch, the ends of the first branches and the adjacent part of the mountings providing the common plane defining the active face of the magnetic head.

The invention also has, as its object; a method for the batch fabrication of single track or multiple-track reading and/or writing magnetic heads, characterized in that it comprises the following steps:

first step: machining of the pole pieces so that they have an active face, a first contact face and a second contact, face, second step: machining of housings to receive the pole pieces in rods of non-magnetic material, third step: fixing of the pole pieces in their housings, fourth step: associating the fitted-up rods two by two with interposition of a film designed to form the gap of the magnetic heads, the association being achieved so as to make the first contact faces of the pole pieces of a rod face that of the pole pieces of the other rod, fifth step: cutting out the two associated rods to give elementary parts of single track or multiple-track active face.

sixth step: mounting of at least one coil on each closing element of the magnetic circuit, seventh step: mounting of each magnetic head by association of its different constituent elements, the closing elements having common faces with the second contact faces of the pole pieces.

The invention will be better understood and other advantages will appear through the following description, given on a non-restrictive basis, and the appended figures, of which:

FIG. 1, represents a pole piece used in the magnetic head according to the invention, FIGS. 2 to 7 illustrate the batch method for the processing of the pole piece mounting rods, FIGS. 8 to 11 illustrate the assembly of a magnetic head according to the invention.

The outline of the pole piece shown in FIG. 1 is especially advantageous within the framework of the present invention. Other shapes may also be put to use if they enable the making of a magnetic head with incorporated gap. In the rest of the description, the term "active faces" shall designate those parts of the pieces designed to be in contact with a magnetic head. A major feature of the invention consists in the association of a high-performance, magnetic, metallic material (to form the pole pieces) and a non-magnetic material such as ceramic (to form the mounting of the pole pieces). These elements not only play a part in the overall geometry of the active face, but also give the magnetic head very high resistance to wear and tear during its use.

The pole piece, designated by the general reference 1, is L-shaped with one arm tapering towards the meeting point of the two arms of the L. The geometry given to the pole piece enables the definition of the particular faces: one active face 2, one face 3 of contact with the gap, one rear face 4 and one face 6 of contact with the magnetic circuit closing element. A groove 5 is machined in the inside corner of the L to eliminate the fillet existing at this place.

The material used to make the pole piece should have very good magnetic characteristics. The following alloys may be used: iron-nickel, iron-nickel-chromium, iron-nickel-molybdenum, iron-nickel-chromium-molybdenum, iron-nickel-chromium-vanadium, iron-silicon, iron-cobalt. Very high performance characteristics are obtained with an iron-nickel alloy comprising 52% of iron and 48% of nickel.

The mountings of the pole pieces may be obtained in the following way: we start with a rod of non-magnetic material which is machined so that the pole pieces can be housed in it. FIG. 2 shows a step in the method for making magnetic heads according to the invention. The rod 10 is advantageously an elongated parallelepiped made of non-magnetic ceramic which stands up especially well to wear and tear. Aluminium oxide of great purity may be used. The machining consists in making grooves 11 and notches 12 which will enable the housing of the pole pieces. FIG. 3 shows the pole pieces 1 housed in the machined rod 10. The pole pieces are fixed in their housing. They may be bonded, forced in or fixed by any other means.

The rods fitted with the pole pieces are then associated two by two, as shown in FIG. 4. In this figure the pole pieces can be seen by their active faces 2 and their rear faces 4. Between the two rods, there is incorporated a thin film 15 (with a thickness of less than 100 $\mu$), intended to form the gap of the magnetic heads. This film may be a material such as mica, glass, beryllium, bronze or, again, an organic material. The association of the two rods 10, the pole pieces and the gap 15 may be reinforced by the incorporation, in the spaces demarcated by the tapering parts of the pole pieces, of an adhesive substance such as epoxy resin. This is what is shown in FIG. 5, which is an underview of FIG. 4. The darkened zones 20 represent the adhesive substance referred to earlier. Then, a cylindrical trueing operation is performed, as shown in FIG. 6, in order to obtain an outline capable of ensuring proper winding and proper contact with the magnetic recording medium.

FIG. 7 illustrates the operation for cutting out fitted-up and machined rods to obtain elementary parts 25 called "active face parts".

FIG. 8 shows the association of this active face with an element 26 for the closing of the magnetic circuit. This element 26 is advantageously shaped like a U or an H, two arms of which will make contact with the faces 6 of the pole pieces. The closing element 26 also supports one or two coils 27 depending on the use to which it is desired to put the magnetic head.

The coil 27 (or coils as the case may be) will have its connections soldered to the outgoing wires 30 of the head as shown in FIG. 9. These outgoing wires are kept fixed in an insulating block 31 which will be enclosed in a casing 35 of the type shown in a sectional view in FIG. 10. The encasing enables ensuring a correct azimuth of the gap during the mounting on the encoding and/or reading instruments. The magnetic unit may be held fixed in the casing by a resin as shown in FIG. 11.

The parts 25 may be simply laid on the element 26 and held by resin or by spots of bonder to the rest of the head. The closing element 26 of the magnetic circuit may be made of ferrite, another sintered material or a metallic material which may be in the form of layers or otherwise. It should have suitable electromagnetic characteristics such as high permeability (2,500 or more), high induction at saturation (0.8 to 2.6 teslas), weak coercive field (about 4.8 A/m) and remanent induction greater than or equal to 0.7 tesla.

One of the advantages of the technology of the invention lies in the fact that a metallic material is associated with a non-magnetic ceramic (in the most advantageous case) material that acts as a wearing piece and enables batch machining so as to give high efficiency and excellent productivity.

The pole piece is preferably made of an alloy based on iron and nickel which may contain additives favoring qualities such as low magnetostriction, a low induction temperature coefficient ranging from $-25°$ C. to $+75°$ C., high remanent induction (of the order of 0.6 tesla) and a weak coercive field (about 4.8 A/m).

The magnetic heads according to the invention may be used for perpendicular or parallel type recordings on an oxide or metallic type of magnetic medium. The recording media used may be rigid or flexible.

The magnetic heads of the invention enable saturation recording on magnetic media having coercive fields of over 20,000 A/m, with recording currents smaller than or equal to 1 ampere peak to peak and for recording densities smaller than or greater than 210 bits per inch (densities normally used in computerized money or access checking applications). The magnetic heads of the invention may be used for reading and writing. They may be single-track or multiple-track heads depending on the cutting-out of the basic rod.

Among the possible applications, we might note: access checking, credit card operations, magnetic toll gates, large-scale consumer applications such as audio or video applications.

I claim:

1. A single-track or multiple-track reading/writing magnetic head for magnetic tracks with strong coercive field comprising:

a non-magnetic mounting having a machined cavity; two pole pieces, each made of a solid metallic material, and which are separated by a gap, each of said pole pieces being housed in said cavity in said non-magnetic mounting wherein the pole pieces and the mounting having a common plane that defines the active face of the magnetic head;

an element for closing a magnetic circuit, said magnetic circuit encompassing said pole pieces, at least one coil set on said closing element; wherein each pole piece is formed having a first and a second arm and further wherein said pole pieces are in the general shape of an L with one arm being tapered toward the meeting point to demarcate a contact face and a gap and are fixed in said cavity which has a corresponding shape, machined in mounting, the combined sets of pole pieces formed by the mounting/pole piece associations being arranged symmetrically with respect to said gap so that each of the pole pieces presented a contact face with the gap formed with their first arm, a contact face with said closing element (26) formed with their second branch, the ends of the first branches and the adjacent part of the mountings providing the common plane defining the active face of the magnetic head; and further wherein the unit formed by the mountings and the pole pieces is joined by an adhesive.

2. A magnetic head according to claim 1, characterized in that the pole pieces are made of an iron and nickel alloy.

3. A magnetic head according to claim 2, wherein said alloy is 52% iron and 48% nickel.

4. A magnetic head according to claim 3, wherein: the mounting is made of ceramic.

5. A magnetic head according to claim 4, wherein: said ceramic is made of aluminum oxide.

6. A magnetic head according to claim 5, wherein: the gap is formed by a film selected from the group of mica, glass, beryllium, bronze or an organic material.

7. A magnetic head according to the claim 1, wherein: said adhesive substance is an epoxy resin.

8. A magnetic head according to claim 7, wherein: the closing element is formed as a U or H shape.

9. A magnetic head according to claim 8, wherein: the closing element is made of ferrite.

10. A magnetic head according to claim 9, wherein: the active face of the head has a cylindrically trued outline.

* * * * *